United States Patent [19]

Reiter

[11] 4,203,635
[45] May 20, 1980

[54] WHEEL MOUNTING AND TAPERED ROLLER BEARING THEREFOR

[75] Inventor: Gerhard Reiter, Massillon, Ohio

[73] Assignee: The Timken Company, Canton, Ohio

[21] Appl. No.: 927,516

[22] Filed: Jul. 24, 1978

[51] Int. Cl.$^2$ .................. F16C 33/58; F16C 33/78
[52] U.S. Cl. ........................ 308/213; 308/16; 308/187.1; 308/214
[58] Field of Search ............ 308/16, 17, 211, 213, 308/214, 218, 187.1

[56] References Cited

U.S. PATENT DOCUMENTS

| | | | |
|---|---|---|---|
| 1,778,060 | 10/1930 | Briggs | 308/187.1 |
| 2,878,084 | 3/1959 | Bermingham | 308/187.1 |
| 3,262,743 | 7/1966 | McNicoll | 308/187.1 |
| 3,460,874 | 8/1969 | Johnson | 308/16 |
| 3,589,747 | 6/1971 | Asberg | 280/96.1 |
| 3,790,238 | 2/1974 | Otto | 308/187.1 |
| 3,915,522 | 10/1975 | Halbig | 308/214 |
| 3,977,741 | 8/1976 | Lundberg | 308/16 |

FOREIGN PATENT DOCUMENTS

| | | | |
|---|---|---|---|
| 121479 | 2/1931 | Austria | 308/214 |
| 7607520 | 11/1977 | Netherlands | 308/16 |
| 211182 | 2/1967 | Sweden | 308/214 |
| 1349340 | 4/1974 | United Kingdom | 308/214 |

Primary Examiner—Richard R. Stearns
Attorney, Agent, or Firm—Gravely, Lieder & Woodruff

[57] ABSTRACT

In a wheel mounting a hub rotates within a steering knuckle or other carrier on a double row tapered roller bearing of the indirect configuration. This bearing includes a double cup that is fitted into the carrier, a pair of cones that are pressed over the hub, tapered rollers arranged in two rows between the opposed raceways of the cup and cones, and a cage for each row of rollers. The retaining ribs on the cones have beveled surfaces so that as the hub is withdrawn from the steering knuckle, in which case one of the cones will be carried along with the hub, the beveled surface on the cone that moves with the hub will deflect the small ends of its rollers outwardly to enable the cone to pass through the rollers and free itself from the cup without shearing off snap rings or similar devices that secure the cup in place.

17 Claims, 4 Drawing Figures

WHEEL MOUNTING AND TAPERED ROLLER BEARING THEREFOR

BACKGROUND OF THE INVENTION

This invention relates in general to bearings and more particularly to a roller bearing suitable for use on automotive axles and a wheel mounting that utilizes such a bearing.

Many subcompact automobiles of current manufacture are driven through their front wheels, and to accommodate this type drive, special wheel mountings have been developed. The typical wheel mounting of this type includes a steering knuckle that pivots to afford the front wheel motion that is necessary to steer the vehicle. The knuckle contains a double row angular contact ball bearing, the outer race of which is a single ring that is pressed into the steering knuckle and retained in place by snap rings that fit into grooves in the knuckle. The inner race of the bearing, on the other hand, consists of two rings—one for each row of balls—and these rings have a wheel hub or so-called drive flange passed through their bores. The powered front axle, in turn, fits through the hub, it being coupled with the hub by means of a spline. A wheel mounting of this construction is illustrated in U.S. Pat. No. 4,010,986.

Conventional wheel mountings of the foregoing construction are relatively easy to disassemble so that the bearings or other internal parts may be replaced. Basically, the steering knuckle is detached from its pivot joints and the entire wheel mounting is pulled off of the splined axle. Then the hub is pressed out of the inboard ring of the inner race. The outboard inner ring merely remains with the hub and passes out of the outboard ring of balls. In this regard, the cage that maintains the proper spacing between adjacent balls of the outboard row also retains the balls within the outer race once the hub has been withdrawn. At this point the snap rings are accessible and may be removed to free the outer race ring.

While the ball bearings of the typical front wheel drive wheel mounting are inexpensive to manufacture and lend themselves to easy disassembly of the mounting, they are not always suited for heavier vehicles, for these vehicles often require the durability of tapered roller bearings in their wheel mountings. Tapered roller bearings are manufactured in configurations that are easily substituted for the typical double row angular ball bearing, and in such configurations they comprise a double cup, a pair of cones that fit into the double cup from each of its ends and two rows of tapered rollers that fit the raceways on the cup and cones, with the large diameter ends of the rollers being presented outwardly. Each cone has ribs at both ends of its raceway, the one at the large end serving to accommodate the thrust forces that tend to expel the rollers from the bearing and the one at the small end serving to prevent the rollers from sliding off of that end of the cone when the cone is handled apart from its cup. The rib at the small end, however, prevents the mounting from being dismantled in the usual manner, for as the hub is pressed out of the steering knuckle, the rollers of the outboard row will, in effect, lodge between the retaining rib at the small end of the outboard cone and the snap ring at the outboard end of the double cup. This causes the force, that is transmitted through the rollers to shear off the snap ring, and render the snap ring extremely difficult to remove.

SUMMARY OF THE INVENTION

One of the principal objects of the present invention is to provide a wheel mounting that utilizes a double row tapered roller bearing, yet is as easy to dismantle as a comparable mounting that utilizes a double row angular contact ball bearing. Another object is to provide a wheel mounting of the type stated that is ideally suited for driven front wheels. An additional object is to provide a double row tapered roller bearing that is ideally suited for use in the mounting of the type stated. These and other objects and advantages will become apparent hereinafter.

The present invention is embodied in a roller bearing having an inner race provided with a beveled retaining rib that is capable of camming the rollers outwardly as the inner race is withdrawn from its outer race. The invention also resides in a wheel mounting that includes the bearing. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
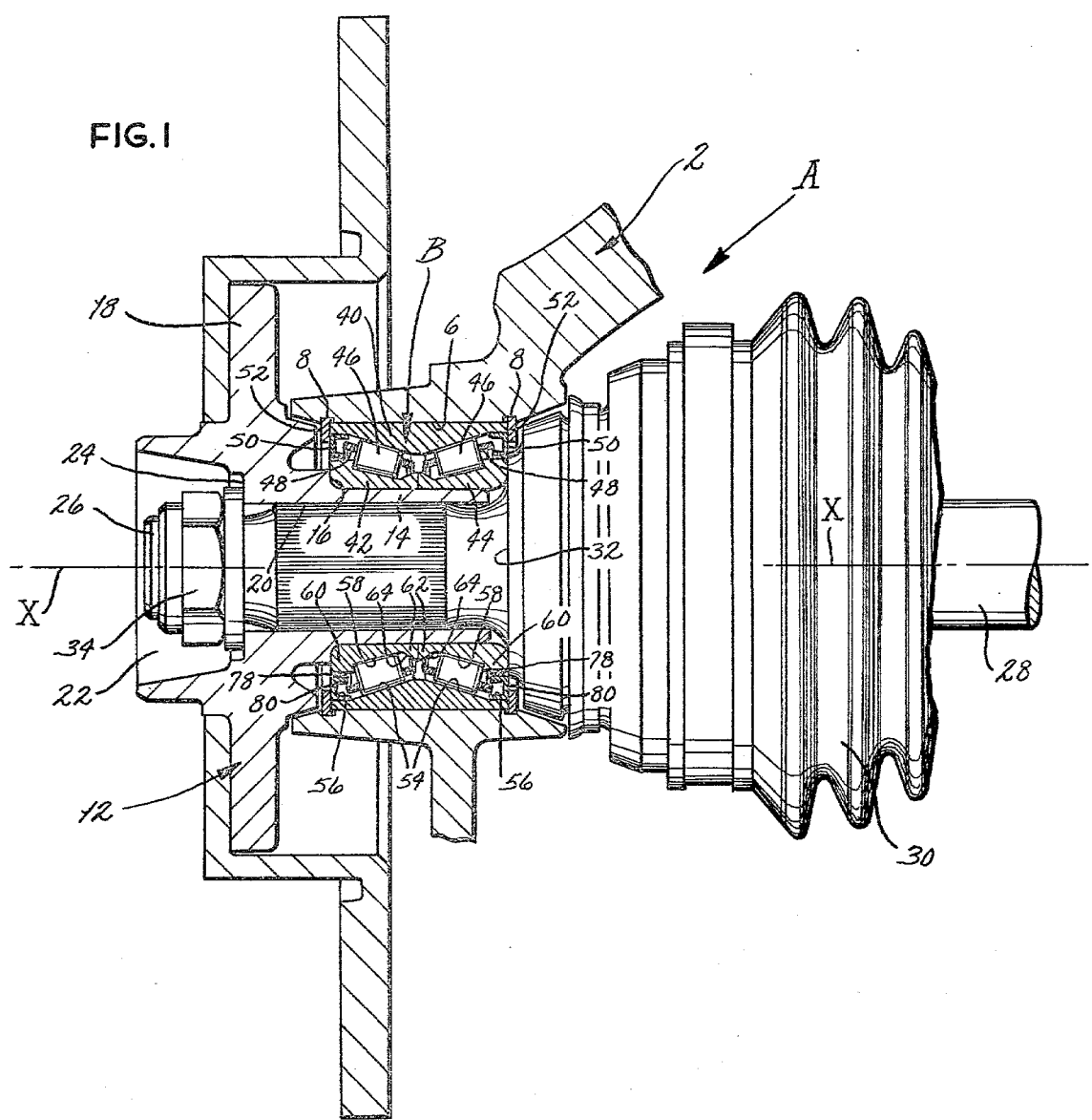
FIG. 1 is a sectional view of a wheel mounting provided with a tapered roller bearing constructed in accordance with the present invention.

Referring now to the drawings (FIG. 1), A designates a wheel mounting which is suited primarily for use at the front wheel locations of front wheel drive automobiles. The mounting A contains a double row tapered roller bearing B of the indirect configuration which enables a wheel (not shown) that is bolted to the mounting A to rotate freely while being confined in the radial and axial directions. In other words, the bearing B takes radial loading as well as thrust loading in both axial directions. In spite of the fact that the rolling elements of the bearing B are tapered rollers, the wheel mounting A is as easy to dismantle as a mounting in which the rolling elements of the bearings are balls.

The mounting A includes (FIG. 1) a steering knuckle 2 which at its ends is connected with ball joints (not shown) of the type currently utilized in front suspension systems. The ball joints enable the steering knuckle to rotate about a generally vertical axis and to also translate upwardly and downwardly along that axis. The former motion, of course, permits the vehicle to be steered, while the latter permits the suspension system to absorb road shocks. Other than accommodating the foregoing movements, the steering knuckle 2 is essentially fixed in position on the frame of the vehicle. The steering knuckle 2 projects outwardly away from the ball joints and has a generally horizontal bore 6 of constant diameter. Near each end of the bore 6, the steering knuckle 2 has an annular groove 8 that opens inwardly into the bore 6.

In addition to the steering knuckle 2, the wheel mounting A further includes a hub 12 that is carried by the steering knuckle 2 and rotates relative to it about an axis X. Actually the hub 12 is mounted on the knuckle 2 by means of the bearing B so that the axis of rotation X is likewise the axis of the bearing B. The hub 12 is a unitary forging and has a spindle 14 which projects into the bore 6 of the steering knuckle 2 where it is encircled by the bearing B. The outside surface of the spindle 14 is constant in diameter and unobstructed at one end. The opposite end is located at a shoulder 16 that is positioned at the outer end of the bore 6 in the steering knuckle 2. Beyond the shoulder 16 the hub 12 has a flange 18 which projects radially outwardly beyond the outer end of the steering knuckle 2 so as to obscure the outboard face of the knuckle 2. The hub 12 contains a bore 20 that extends completely through the spindle 14, with the walls of the bore 20 being ribbed to provide a spline. At its outer end the bore 20 opens into an enlarged cavity 22 that is exposed along the outwardly presented face of the hub 12, there being an internal shoulder 24 at the juncture of the bore 20 and cavity 22.

The bore 20 of the hub 12 receives a stub shaft 26 which is connected to an axle shaft 28 through a universal joint 30 that is located adjacent to the inner end of the bore 6 in the steering knuckle 2. The stub shaft 26 rotates with the axle shaft 28 and has a spline which engages the spline in the bore 20 of the hub 12. At its inner end the stub shaft 26 has a shoulder 32 which is small enough to fit into the bore 6 of the steering knuckle 2. The outer end of the stub shaft 26 is threaded and projects into the enlarged cavity 22 of the hub 12 where a nut 34 is threaded over it. This nut is turned down against the internal shoulder 24 in the hub 12, and thereby clamps the hub 12 against the bearing B, so that the hub 12 will not migrate away from the steering knuckle 2.

The bearing B fits into the bore 6 of the steering knuckle 2 and encircles the spindle 14 of the hub 12, thus enabling the hub 12 to rotate relative to the steering knuckle 2. The bearing B includes (FIG. 1) a double cup 40 that fits into the bore 6 of the steering knuckle 2, a pair of cones 42 and 44 that fit over the spindle 14 of the hub 12, tapered rollers 46 arranged in two rows between the cones 42 and 44 and the cup 40, cages 48 for maintaining the proper spacing between the rollers 46 of each row, and seal units 50 which fit into the ends of the double cup 40 and contact the cones 42 and 44 to close the ends of the bearing B. The double cup 40 constitutes the outer race for the bearing B, whereas the cones 42 and 44 constitute separate inner races. The large diameter ends of the rollers 46 in the two rows are presented outwardly toward the ends of the bearing B, so that the bearing B has the indirect configuration.

The outer surface of the cup 40 is cylindrical and slightly larger in diameter than the bore 6 so that an interference fit will exist between the cup 40 and the steering knuckle 2. Moreover, the length of the cup 40 is slightly less than the spacing between the two annular grooves 8 in the steering knuckle 2 which enables the cup 40 to be located between them. The grooves 8 hold snap rings 52 which are located opposite the end faces of the cup 40 to insure that the cup 40 does not move axially in the bore 6. On its inside face the cup 40 has two tapered raceways 54 which converge toward the center of the cup 40. One raceway 54 surrounds the cone 42, while the other surrounds the cone 44, and each at its large diameter end merges into a short axial extension 56 that runs out to the adjacent end face of the double cup 40.

The bores of the two cones 42 and 44 are cylindrical and slightly smaller in diameter than the outer diameter of the spindle 14 so that an interference fit exists between the two cones 42 and 44 and the spindle 14 of the hub 12. Indeed, the cones 42 and 44 are pressed over the spindle 14 until the back face of the outboard cone 42 locates against the hub shoulder 16 and the front face of the inboard cone 44 is against the front face of the outboard cone 44. The shoulder 32 on the stub shaft 26, in turn, bears against the back face of the inboard cone 44. Each cone 42 and 44 has a tapered raceway 58 that is located opposite one of the tapered raceways 54 on the cup 40 and a thrust rib 60 that is between the cone back face and the large diameter end of the cone raceway 58. The thrust ribs 60 of the two cones 42 and 44 have cylindrical surfaces that are located directly inwardly from the short axial extensions 56 at the ends of the double cup 40.

The rollers 46 are arranged in two rows between the corresponding raceways 54 and 58 of the cup 44 and the cones 42 and 44, with their side faces contacting the raceways 54 and 58 and their large diameter end faces bearing against the thrust ribs 60 of the cones 42 and 44. As is the case with a true tapered roller bearing, the conical side faces of the rollers 46 in each row if extended far enough to produce apexes for the individual rollers 46, would have those apexes located at a single point along the axis of rotation X, and the same holds true as to the tapered raceways 54 and 58 along which those rollers 46 run.

In addition to its thrust rib 60, each cone 42 and 44 has a retaining rib 62 (FIGS. 1 & 2) located opposite the small diameter ends of the rollers 46 in that row which is around it. The retaining rib 62 for each cone 42 and 44 serves the usual purpose in that it prevents the rollers 46 for that cone from sliding down the cone raceway 58 and off of the cone. In this regard, the cone, rollers, and cage of a tapered roller bearing are called a cone assembly, and the fact that the rollers are held about the cone in such a bearing facilitates handling, and assembly and disassembly procedure as well. Actually, the cage keeps the tapered rollers from falling radially away from the cone while the retaining rib keeps the rollers and the cage from sliding axially off of the small diameter end of the cone. So it is with the bearing B, for when the cones 42 and 44 are fitted with their tapered rollers 46, the cages 48 keep the rollers 46 along the cone raceways 58, while the retaining ribs 62 keep the rollers 46 and cages 48 from sliding off of the ends of their respective cones 42 and 44.

In contrast to conventional cones, the retaining rib 62 on each of the cones 42 and 44 does not provide an abrupt transition at the small diameter end of the cone raceway, but instead has a beveled surface 64 (FIG. 2) that leads away from the small end of the raceway 58, increasing in diameter toward the cone front face. The angle between the surface 64 and the axis X of the bearing B should range between 12° and 25° and should preferably be about 18°. Actually, the beveled surface 64 does not merge directly with the raceway 58, but instead extends somewhat deeper into the cone 42 and is separated from the raceway 58 by a grinding relief 66.

The configuration of the retaining rib 62 is such that it will without much difficulty pass through the row of rollers 46 as the cone 42 or 44 is withdrawn from the cup 40 (FIG. 4), assuming that the rollers 46 are displaced slightly toward that end of the cup 40 out of which the cone 42 or 44 is withdrawn so as to provide a slight amount of clearance at the small diameter ends of the rollers 46. Indeed, the beveled surface 64 of the retaining rib 62 deflects or cams the small diameter ends of the tapered rollers 46 outwardly as the cone 42 is withdrawn from the cup 40. Consequently, the small diameter end of the beveled surface 64 on the retaining rib 62 should be no greater in diameter than the small diameter end of the cone raceway 58, and should preferably be slightly smaller.

Figure 2:
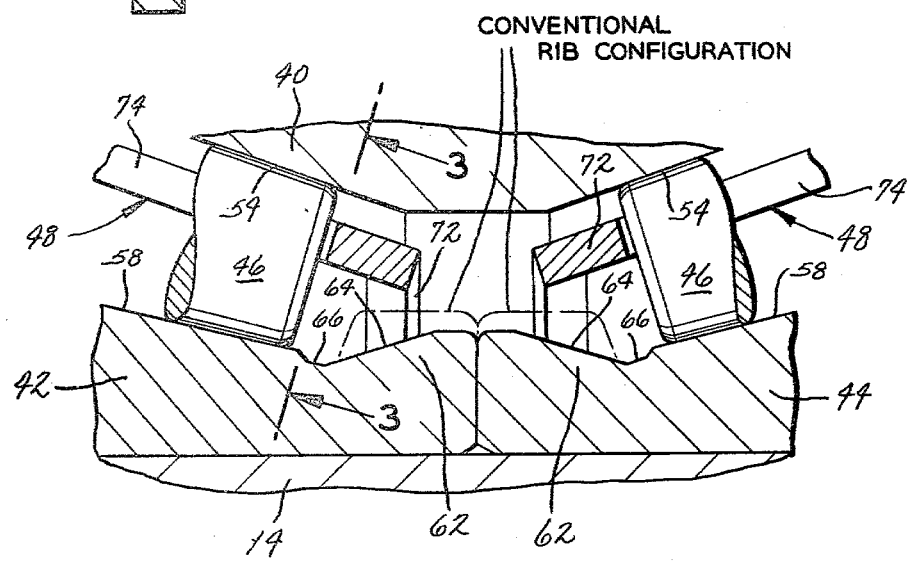
FIG. 2 is a fragmentary sectional view of the bearing, particularly showing the configuration of its cone retaining ribs and a comparison to standard cone retaining ribs which are illustrated in phantom.
Figure 3:
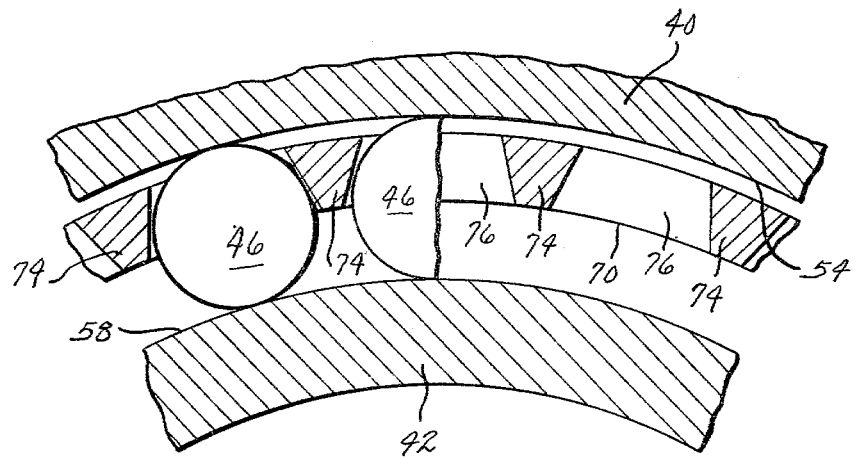
FIG. 3 is a sectional view taken along line 3—3 of FIG. 2 and showing the cage configuration which enables the cage to maintain the tapered rollers on the cone.

The cage 48 for each row of tapered rollers 46 lies slightly beyond the axial centerlines of the rollers 46 (FIGS. 2 & 3). It includes a large diameter end ring 70 that is located opposite the large ends of the rollers 46, a small diameter end ring 72 located opposite the small ends of the rollers 46, and bridges 74 that extend axially between the rollers 46 and connect the large and small rings 70 and 72, thereby creating roller pockets 76 in which the rollers 46 are confined. The bridges 74 are beveled along their side faces to conform to the contour of the adjacent roller side faces, and since the bridges 74 are disposed outwardly beyond the axial center lines of the rollers 46, they prevent the rollers 46 from falling outwardly away from the cone 42 or 44 during handling of the cone assembly. Nevertheless, the cage 48 possesses enough flexibility to enable the rollers 48 at their small diameter ends to move over the retaining rib 62. For this reason, it is more desirable to use a cage 48 that is molded from a polymer, such as heat stabilized nylon 66, than to use one that is stamped from steel as is the usual practice.

The ends of the bearing B are closed by the seal units 50 including seal cases 78 that are pressed into the axial extensions 56 of the cup 40 and elastomeric seal elements 80 which are bonded to the cases 78 and bear against the outwardly presented surfaces of the thrust ribs 60 on the cones 42 and 44. Each seal case 78 is configured to accommodate the large end ring 70 for the adjacent cage 48. Moreover, the large ends of the tapered rollers 46 for the two cones 42 and 44 are spaced from their respective seal cases 78. Of course, as the outboard cone 42 is withdrawn from the cup 40 the rollers 46 of that cone will move toward the outboard seal case 78 and in so doing will move up the taper of the cup raceway 54. When the large end ring 70 of the cage 48 is against the seal case 78, the small ends of the rollers 46 can be expanded outwardly a sufficient distance to enable the retaining rib 62 on the cone 42 to pass through the small ends of the rollers 46, thus freeing the outboard cone 42 from the rollers 46, the case 48, and the cup 40.

To assemble the wheel mounting A, the outboard snap ring 52 is contracted and fitted into its annular groove 8 in the steering knuckle 2. Then the cup 40 of the completely assembled bearing B is pressed into the bore 6 of the steering knuckle 2 from the inboard end of that bore until it is centered between the two annular grooves 8. Since the bearing B is in an assembled condition the cones 42 and 44 and their corresponding tapered rollers 46 and cages 48, and the seal units 50, enter the steering knuckle 2 along with the cup 40. The seal units 50 serve to unitize the bearing B and thereby prevent the cones 42 and 48 from falling out of it. Indeed, the bearing B is preferably supplied in an assembled or unitized condition, that is, with the cones 42 and 44 and the seal units 50 in place.

Once the bearing B is installed within the bore 6 of the steering knuckle 2, the inboard snap ring 52 is contracted and then fitted into its annular groove 8. The snap rings 52 provide positive stops at the ends of the cup 40 and thereby prevent the cup 40 from migrating out of the bore 6, notwithstanding the interference fit.

Thereafter, the spindle 14 of the hub 12 is pressed through the bores of the two cones 42 and 44 until the shoulder 16 at the outboard end of the spindle 14 comes against the backface of the outboard cone 42. Then, the steering knuckle 2 is connected to the front suspension and in so doing the stub shaft 26 is fitted into the bore 20 of the hub 12. Next, the nut 34 is threaded over that end of the stub shaft 26 which projects into the enlarged cavity 22, and when turned down, the two cones 42 and 44 are clamped together tightly between the shoulder 32 on the stub shaft 26 and the shoulder 16 on the spindle 14. Since the front faces of the two cones 42 and 44 abut within the cup 40, the bearing is preset, that is no adjustment is required.

Figure 4:
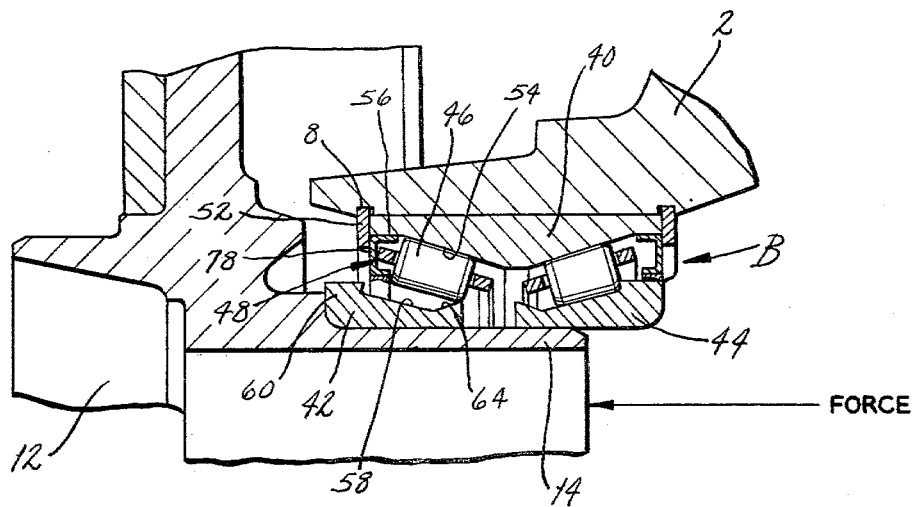
FIG. 4 is a fragmentary sectional view of the bearing undergoing disassembly.

To disassemble the wheel mounting A for replacement of the bearing B, the nut 34 is first removed from the stub shaft 26 and then the steering knuckle 2 is detached from the remainder of the suspension system. This allows the wheel mounting A to be removed from the vehicle. Thereafter, the hub 12 is pressed out of the cones 42 and 44 of the bearing B, and since the flange 18 projects beyond the bore 6, the force must be applied in the direction which urges the flange 18 away from the steering knuckle 2 (FIG. 4). As the spindle 14 of the hub 12 moves axially, it slides through the bore of the inboard cone 44, since that cone is incapable of moving through the cup 40, it being retained in place by rollers 46 which seat tightly against the opposed raceways 54 and 58 of the cup 40 and cone 44. However, the outboard cone 42 moves with the spindle 12, bringing the cage 48 and the rollers 46 of the outboard row along with it. After a short distance the large end ring 70 of the outboard cage 48 comes against the outboard seal case 78 which prevents further axial movement of the cage 48 and its rollers 46. In effect the outboard seal unit 50 and the snap ring 52 which backs it constitute blocking means or a blocking element at the large diameter end of the outboard raceway 54 for the cup 40. Thereafter, the beveled surface 64 on the retaining rib 62 for the outboard cone 42 comes against the small diameter end edges of the rollers 46 and deflects the small ends of the rollers 46 outwardly toward the cup raceway 54. In this regard, the rollers 46, having moved up the cup raceway 54, no longer seat against the two raceways 54 and 58. Indeed, the clearance that exists in the small ends of the rollers 46 is slightly greater than the maximum projection of the retaining rib 62 in the radial direction beyond the small diameter end of the tapered cone raceway 58. As a consequence, the beveled surface 64 deflects the small ends of the rollers 46 in the outboard row outwardly. Being formed from a flexible material, the cage 48 accommodates this displacement. As a consequence, the spindle 14 passes completely out of the inboard cone 44 and the cup 40.

Once the hub 12 is free from the steering knuckle, the snap rings 52 may be removed so that the cup 40 may be pressed from the steering knuckle 2. In this regard, the snap rings 52 are easily accessible and are not in any way damaged by removal of the hub 12. It will be recalled that a tapered roller bearing having a conventional cone at the outboard position would drive the outboard set of rollers or cage against the adjacent seal case which in turn would shear the outboard snap ring to the extent that it would be extremely difficult to contract and remove from its groove. Of course, the outboard snap ring 52 is inaccessible when the wheel mounting A is assembled because of the outward projection of the flange 18 on the hub 12.

In lieu of using the unitary double cup 40, two single cups could be used in its place. Also, the cages 48 may be designed to retain the rollers in position within the cup 40 after the cone 42 is removed. Moreover, the usefulness of the bearing B and its variations is not confined exclusively to driven front wheels or for that matter wheel mountings at all.

This invention is intended to cover all changes and modifications of the example of the invention herein chosen for purposes of the disclosure which do not constitute departures from the spirit and scope of the invention.

What is claimed is:

1. A roller bearing comprising an outer race having an inwardly presented tapered raceway, an inner race located within the outer race and having an outwardly presented tapered raceway located opposite the raceway for the outer race, the inner race further having a thrust rib at the large diameter end of its tapered raceway and a retaining rib at the small diameter end of its tapered raceway, the retaining rib having a beveled outwardly presented surface that leads away from the small end of the raceway for the inner race, increasing in diameter as it does; and rollers arranged in a row between the raceways of two races, with each roller having a large diameter end and a small diameter end, the large diameter ends of the rollers being adjacent to and normally abutting the thrust rib of the inner race and the small diameter ends being adjacent to the retaining rib of the inner race, the rollers and retaining rib being dimensioned and shaped such that as the inner race is withdrawn axially out of the outer race, the retaining rib will move the rollers axially a short distance until axial movement is blocked by means located adjacent to the large diameter end of the outer race, and whereupon the beveled surface on the retaining rib will deflect the small diameter ends of the rollers outwardly to an extent sufficient to free the inner race from the rollers and outer race.

2. A roller bearing according to claim 1 wherein the diameter of the small diameter end of the beveled surface on the retaining rib for inner race is no greater than the diameter of the small end of the raceway for the inner race.

3. A roller bearing according to claim 1 and further comprising a cage having spacing elements that extend between adjacent rollers to maintain the proper spacing between such rollers, the cage being sufficiently flexible to enable the rollers to move outwardly with respect to the spacing elements when the inner race is withdrawn from the outer race.

4. A roller bearing according to claim 1 and further comprising a cage having large and small end rings that extend past the large and small ends, respectively, of the rollers, and bridges connecting the end rings and extending between adjacent rollers, all to provide pockets in which the rollers are contained, so that proper spacing will be maintained between adjacent rollers, the bridges further being located outwardly beyond the axial centerlines of the rollers so as to prevent the rollers from falling away from the inner race when the inner race and the rollers are out of the outer race, the cage being sufficiently flexible to enable the rollers to move outwardly as the inner race is withdrawn from the outer race and the rollers.

5. A roller bearing according to claim 1 and further comprising a seal unit at the end of the outer race and closing the space between the thrust rib on the inner race and the large diameter end of the raceway on the outer race, the seal unit normally blocking movement of the rollers out of the outer race in the axial direction.

6. A roller bearing according to claim 5 wherein the outer race has an extension beyond the large diameter end of its tapered raceway and the seal unit is pressed into the extension and bears against the thrust rib.

7. A roller bearing according to claim 1 wherein the beveled surface at its small end has a lesser diameter than the small end of the raceway on the inner race and a concave intermediate surface connects the small ends of the raceway on the inner race and the beveled surface.

8. A roller bearing according to claim 1 wherein the outer race is a double cup having two raceways, with the large diameter ends of the raceways being closer to the ends of the cup than the small diameter ends, and the inner race is one of two cones, with each cone being located opposite a different raceway of the cup.

9. A roller bearing according to claim 8 wherein the front end faces of the two cones abut within the cup so that the adjustment of the bearing is fixed and determined.

10. In combination with a steering knuckle having a bore therein and a hub that has a spindle which projects into the bore of the steering knuckle, an improved bearing assembly for mounting the hub in the steering knuckle, said bearing assembly comprising: an outer race fitted into the bore of the steering knuckle and being fixed in position with respect to the knuckle, the outer race having pair of inwardly presented raceways which are tapered such that the smallest diameter of each raceway is toward the center of the outer race; a blocking element fixed in position axially with respect to the outer race adjacent to the large diameter end of at least one of the raceways for the outer race and being of lesser diameter than the large diameter end of that raceway; first and second inner races fitted around the hub for rotation with the hub, the first inner race being adjacent to the blocking element and further being small enough to be withdrawn axially through the blocking element, each inner race having a raceway that is tapered and presented outwardly opposite a different raceway of the outer race, each inner race further having a thrust rib at the large diameter end of its raceway and a retaining rib at the small diameter end of its raceway, the retaining rib of at least the first inner race having a beveled surface that leads away from the raceway of that race and becomes progressively greater in diameter; rollers arranged in first and second rows with the first row being between the raceway of the first inner race and the corresponding raceway of the outer race and the second row being between the raceway of the second inner race and the corresponding raceway of the outer race, the rollers of each row conforming to the contours of the raceways along which they are disposed and having their large diameter ends located along the thrust ribs of the inner races around which such rollers are arranged, the rollers of the first row and the retaining rib of the first inner race being configured such that when the hub is withdrawn from the outer race in the direction which causes the first inner race to move out of the outer race, the beveled surface on the first inner race will engage the rollers of the first row and move them axially a short distance until they are blocked against further axial movement by the blocking element and will further deflect the small ends of those rollers outwardly and permit the retaining rib to pass through the row of rollers around the first inner race.

11. The structure according to claim 10 and further including positioning means located on the steering knuckle opposite each end of the outer race for preventing the outer race from moving axially in the bore of the steering knuckle, said positioning means at that end of the outer race at which the first inner race is located projecting further inwardly than the larger end of the raceway for the outer race so as to interfere with the rollers of the first row as the first inner race is withdrawn from the outer race, thereby preventing further movement of the first row of rollers with the first inner race.

12. The structure according to claim 11 wherein the outer race beyond the large diameter ends of its two raceways has axially extended surfaces that lead out to the positioning means, and further comprising seal units mounted along the axially extended surfaces so as to be between the large diameter ends of the rollers and the positioning means, the seal units having seals that contact the thrust ribs of the inner races so as to close the ends of the bearing.

13. The structure according to claim 11 wherein the hub has a flange which projects outwardly beyond that end of the bore at which the first inner race and first row of rollers are located so that the hub can be withdrawn from the bore in only one axial direction.

14. The structure according to claim 13 wherein the angle of the beveled surface on the retaining rib of the first inner race is between 12° and 25° with respect to the axis of rotation for the bearing.

15. The structure according to claim 13 wherein the diameter of the small end of beveled surface on the retaining rib of the first inner race is no greater than the diameter of the small end of that tapered raceway on that race.

16. The structure according to claim 13 and further comprising a cage surrounding the first inner race and having pockets in which the rollers of the first row are contained, the cage being located beyond the axial centerlines of the rollers in the first row so as to prevent the rollers of that row from falling away from the first cone when the first inner race and the rollers are removed from the outer race, the cage being sufficiently flexible to enable the small ends of the rollers in the first row to move outwardly when deflected by the beveled surface.

17. A roller bearing assembly comprising: an outer race having an inwardly presented tapered raceway; a blocking element located adjacent to the large diameter end of the raceway for the outer race and being fixed in position axially with respect to the outer race, the element being at least in part located radially inwardly from the large diameter end of the raceway for the outer race; an inner race located within the outer race and having an outwardly presented tapered raceway located opposite the raceway for the outer race, the inner race being small enough to pass axially through the blocking element and further having a thrust rib at the large diameter end of its tapered raceway and a retaining rib at the small diameter end of its tapered raceway, the retaining rib having a beveled outwardly presented surface that leads away from the small end of the raceway for the inner race, increasing in diameter as it does; and rollers arranged in a row between the raceways of two races, with each roller having a large diameter end and a small diameter end, the large diameter ends of the rollers being adjacent to and normally abutting the thrust rib of the inner race and the small diameter ends being adjacent to the retaining rib of the inner race, the rollers and retaining rib being dimensioned and shaped such that as the inner race is withdrawn out of the outer race, the beveled surface on the retaining rib will engage the rollers and move them axially until they are blocked by the blocking element and will further deflect the small diameter ends of the rollers outwardly to an extent sufficient to free the inner race from the rollers and the outer race.

* * * * *

UNITED STATES PATENT AND TRADEMARK OFFICE
CERTIFICATE OF CORRECTION

PATENT NO. : 4,203,635
DATED : May 20, 1980
INVENTOR(S) : Gerhard Reiter

It is certified that error appears in the above-identified patent and that said Letters Patent are hereby corrected as shown below:

Claim 5, column 8, line 8, delete "comprising" and insert therefor --- characterized in that the means located adjacent to the large diameter end of the outer race includes---.

Claim 16, column 10, line 8, delete "cone" and insert therefor --- inner race---.

Signed and Sealed this

Twenty-ninth Day of July 1980

[SEAL]

Attest:

SIDNEY A. DIAMOND

Attesting Officer

Commissioner of Patents and Trademarks